US008275939B2

(12) United States Patent
Gupta et al.

(10) Patent No.: US 8,275,939 B2
(45) Date of Patent: *Sep. 25, 2012

(54) PREVENTING DATA LOSS IN A STORAGE SYSTEM

(75) Inventors: Ratnesh Gupta, Sunnyvale, CA (US); James Leong, Hillsborough, CA (US); Atul Goel, Santa Clara, CA (US)

(73) Assignee: Network Appliance, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/310,252

(22) Filed: Dec. 2, 2011

(65) Prior Publication Data

US 2012/0079322 A1 Mar. 29, 2012

Related U.S. Application Data

(63) Continuation of application No. 11/939,036, filed on Nov. 13, 2007, now Pat. No. 8,074,019.

(51) Int. Cl.
*G06F 11/14* (2006.01)
*G06F 12/00* (2006.01)
*G06F 13/00* (2006.01)

(52) U.S. Cl. ............... 711/114; 711/118; 711/E12.069; 714/6.22; 714/6.3; 714/15; 714/16; 714/E11.113

(58) Field of Classification Search ................... None
See application file for complete search history.

(56) References Cited

U.S. PATENT DOCUMENTS

| 4,228,500 | A  | * | 10/1980 | Webster ......................... 711/1 |
| 5,448,719 | A  | * | 9/1995 | Schultz et al. ............... 714/5.11 |
| 5,537,533 | A  | * | 7/1996 | Staheli et al. ............... 714/5.11 |
| 5,909,540 | A  | * | 6/1999 | Carter et al. ................. 714/4.4 |
| 6,701,332 | B1 | * | 3/2004 | Vella ........................... 711/171 |
| 6,757,695 | B1 | * | 6/2004 | Noveck et al. ................. 707/1 |
| 7,392,281 | B1 | * | 6/2008 | Kanojia et al. ............... 709/202 |
| 2002/0103819 | A1 | * | 8/2002 | Duvillier et al. ............. 707/206 |
| 2003/0028514 | A1 | * | 2/2003 | Lord et al. ..................... 707/1 |
| 2005/0144381 | A1 | * | 6/2005 | Corrado ....................... 711/114 |
| 2006/0218362 | A1 | * | 9/2006 | McManis ..................... 711/162 |
| 2007/0005790 | A1 | * | 1/2007 | Chang et al. ................. 709/231 |
| 2007/0156954 | A1 | * | 7/2007 | Trika et al. ................... 711/113 |

* cited by examiner

*Primary Examiner* — Jasmine Song
*Assistant Examiner* — Daniel Bernard
(74) *Attorney, Agent, or Firm* — Blakely, Sokoloff, Taylor & Zafman LLP

(57) ABSTRACT

Storage servers use a fast, non-volatile or persistent memory to store data until it can be written to slower mass storage devices such as disk drives. If the server crashes before a write can complete, the data remains safely stored in non-volatile memory. If the data cannot be committed to disk when the server reboots (e.g. because the destination mass storage device is unavailable), it is stored in a file. When the disk reappears, the data in the file may be used to restore a file or filesystem on the disk to a consistent state.

18 Claims, 8 Drawing Sheets

PREVENTING DATA LOSS IN A STORAGE SYSTEM

RELATED APPLICATION

This present patent application is a Continuation of application Ser. No. 11/939,036, now U.S. Pat. No 8,074,019 filed Nov. 13, 2007, entitled "Preventing Data Loss in a Storage System," assigned to the corporate assignee of the present invention and which is incorporated by reference herein.

FIELD

The invention relates to data storage operations. More specifically, the invention relates to procedures for preventing data loss that might otherwise occur when a data storage system experiences operational anomalies.

BACKGROUND

Many contemporary data processing systems produce, consume and/or process vast quantities of data. Storing this data securely, so that it is unlikely to be lost or corrupted if a hardware failure, power outage or system crash occurs, yet accessibly, so that it can be read and written quickly, presents an ongoing challenge. The problem is particularly acute in a class of computing devices whose principal purpose is to administer data storage for many clients. These devices, called storage servers, may manage terabytes or petabytes of storage space and serve thousands of clients.

FIG. 2 shows an example of functional blocks and operational flows in a storage server processing a request from a client 200 to save data. The client's request 205 is received by a network access module 210, and is passed up to a protocol handling module 215 after any network-specific information (e.g. source and destination addresses) is removed. The request 220 is processed by the protocol handler 215 to verify data integrity, client access permissions, and so on; then the data 225 is passed up to a file system manager 230 for further processing.

File system manager 230 maintains data structures and other information (e.g., a "file system") that permit it to present the storage space available at the storage server in a convenient form for clients' use. Typically, a storage server appears to a client as an indexed array of uniformly-sized data blocks, or as a hierarchical tree of directories ("folders") containing other directories and files ("documents"). (Some storage servers present an object-oriented view, where arbitrarily-sized stored data may be identified and accessed via a unique key.)

The underlying data storage is often provided by electromechanical devices such as hard disk drives 235, but such devices may operate relatively slowly (or may be heavily utilized) so that forcing client 200 to wait for the data to be stored on the disks 235 would cause unacceptably long delays. Therefore, most storage servers perform some sort of buffering or caching so that a response (acknowledgement) can be sent to the client more quickly. A sophisticated storage server will implement measures to protect client data that has been acknowledged but not yet committed to a long-term mass storage device. In the example system described here, file system manager 230 stores a copy of client data 225 in a temporary memory 240 (client data copy shown as element 245 in FIG. 2), and can immediately return a response 250 to the protocol handler 215, which packages the response 255 and passes it to network access layer 210. The response is further encapsulated 260 for transmission over a network, and is eventually received by client 200.

While the response is being prepared and transmitted, file system manager 230 also begins the more time-consuming task of arranging for the client data to be stored on disks 235. For example, the data may be passed to RAID logic 265, where it is prepared for storage on one or more of a group of independent disks operated as a redundant array (a "RAID group," where "RAID" stands for "Redundant Array of Independent Disks"). The data may be split into pieces 270, and a parity or checksum piece 275 computed, in preparation for writing on the disks of an array. A copy of the parity piece 275 may also be stored in temporary memory 240 (element 280). The prepared pieces 270, 275 are forwarded to storage drivers 285, and each piece 290 is stored on an appropriate one of the disks 235. Once the data is committed, the user and RAID parity/checksum data 245, 280 in temporary memory 240 can be discarded.

Temporary memory 240 is like a staging area that stores and protects the data between the time the client's write is acknowledged and the time all of the data is actually written to disk. If the storage server crashes or disks 235 become inaccessible, the client data copy 245 in temporary memory 240 permits the system to restart the write processing, and if the RAID data preparation has already been completed, RAID parity data copy 280 permits the RAID disks to be brought up to date.

FIG. 3 shows a detailed view of disks 235, depicted as arrays of blocks from block 0 to the last block of each disk, for disks 310, 320, 330 and 340. If the system crashes or disks become unavailable during RAID writing, so that some new data 350, 360 has been written, but some old data 370, 380 remains, then data 245, 280 in temporary memory 240 may be essential to ensure that the RAID devices can be brought to a consistent state without data loss.

Enterprise-class storage servers commonly use a temporary or staging memory as described above to improve write performance. However, under certain circumstances, the server may encounter a situation where it must either operate with degraded performance or discard acknowledged user data (causing data loss or corruption). These are, of course, both undesirable outcomes. Methods of avoiding these outcomes may be useful for improving storage server performance.

SUMMARY

An embodiment of the invention identifies uncommitted data records in a persistent store during system initialization or storage aggregate discovery, saves uncommitted records to corresponding storage aggregates if they are available, and then stores any uncommitted records that correspond to unavailable aggregates in a file for later use. If the unavailable aggregates later become available, the data in the file may be saved to bring those aggregates into a consistent state.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION

Figure 2:
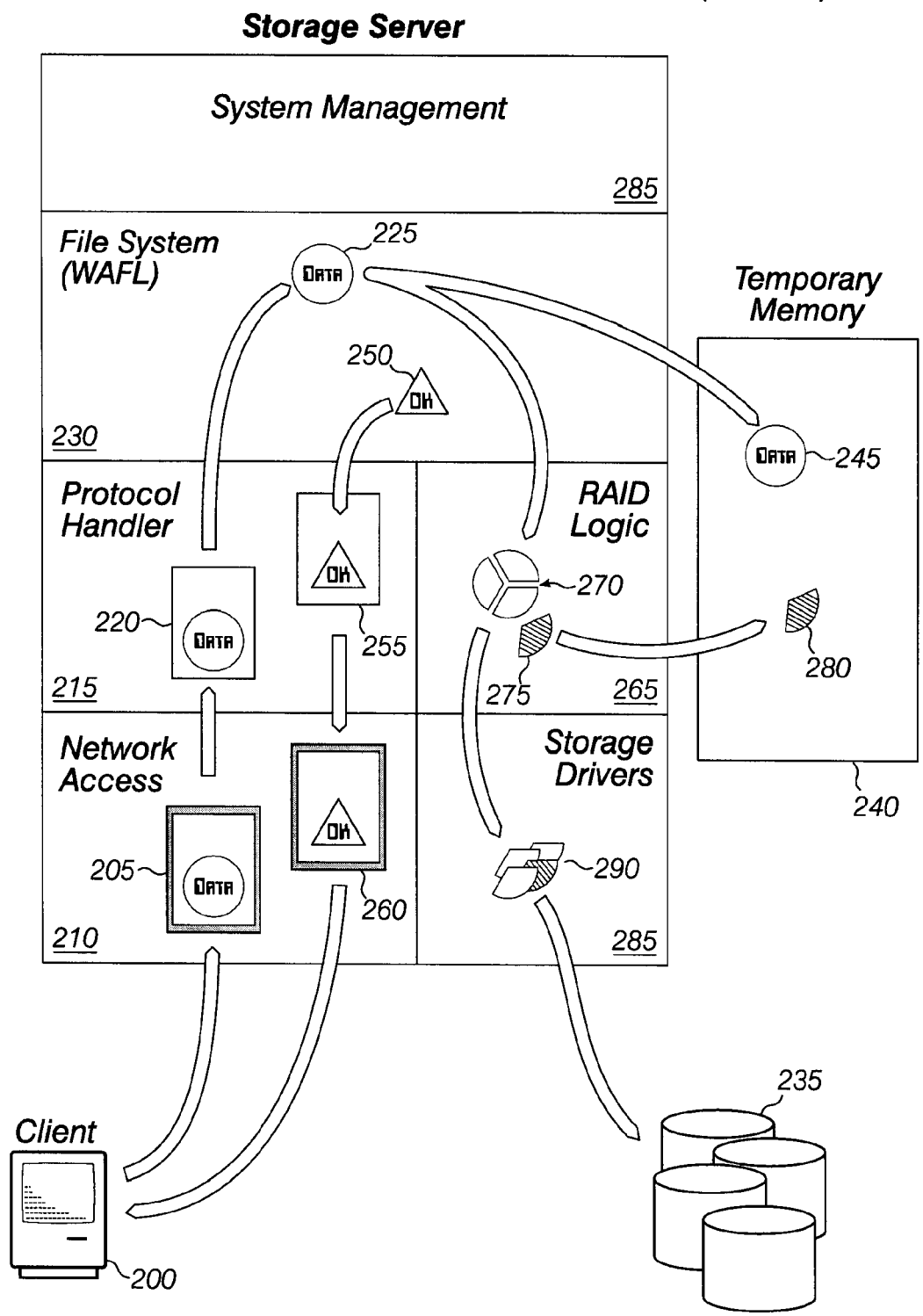
FIG. 2 depicts logical blocks and event flow within a storage server.
Figure 3:
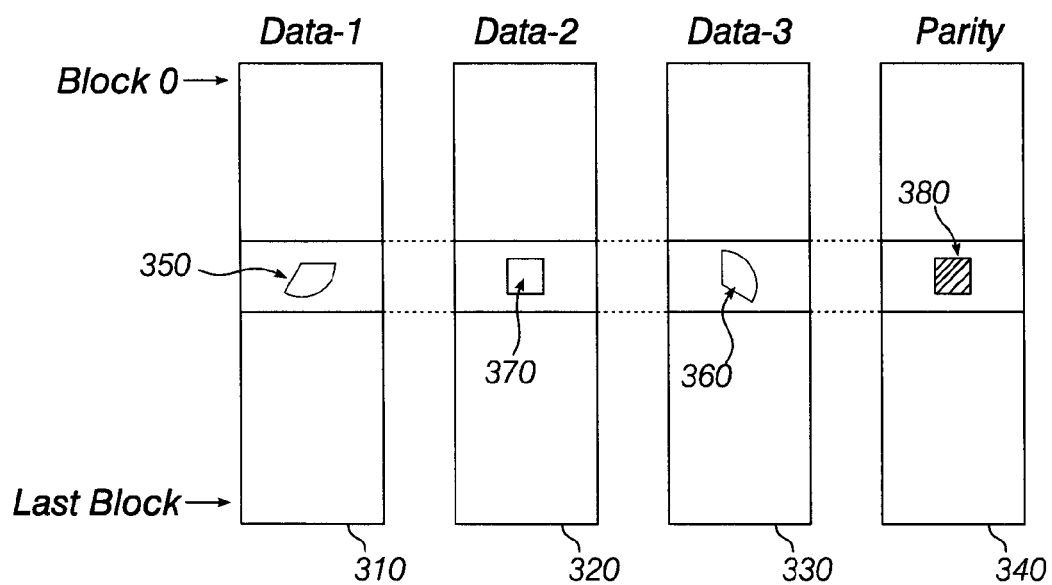
FIG. 3 represents data "stripes" stored on a Redundant Array of Independent Disks ("RAID array").

Enterprise-class data storage systems are the product of intensive design and development processes, which are directed at the goals of storing user information securely and quickly. In many cases, these goals are antagonistic: it takes longer to store data in a way that protects it against foreseeable problems such as disk failures, power outages, and software bugs. By using a persistent memory such as a Flash memory, a battery-backed memory, or a non-volatile random access memory ("NVRAM") as the "temporary memory" described above in reference to FIG. 2, storage servers can reduce client write latency, improving both performance and reliability.

Consider the situation that may arise if a mass storage device such as a disk (e.g., a disk within a storage aggregate) begins to experience intermittent errors. A client writes data destined for the aggregate containing the failing device, and the storage server acknowledges the write after storing a copy of the data in the persistent memory. Now, before the data can be saved on the aggregate, the system crashes. When it reboots, the client's data is found preserved in the persistent memory. Unfortunately, because of the failing mass storage device, the aggregate is not accessible for writing: perhaps the disk has failed completely, or perhaps it has been replaced with a new unit, but the new unit has not yet completed a lengthy initialization process. Therefore, the server must either leave the client's data in the persistent memory (consuming a relatively scarce resource that is important for server performance), or discard the client's data (possibly causing data loss and/or corruption). Worse, the server may not be able to determine when (or even whether) the storage aggregate to which the data was to be written will become available again. Typically, in light of this uncertainty, the data in the persistent memory is simply discarded if it cannot be written to its destination quickly during system startup.

Figure 1A:
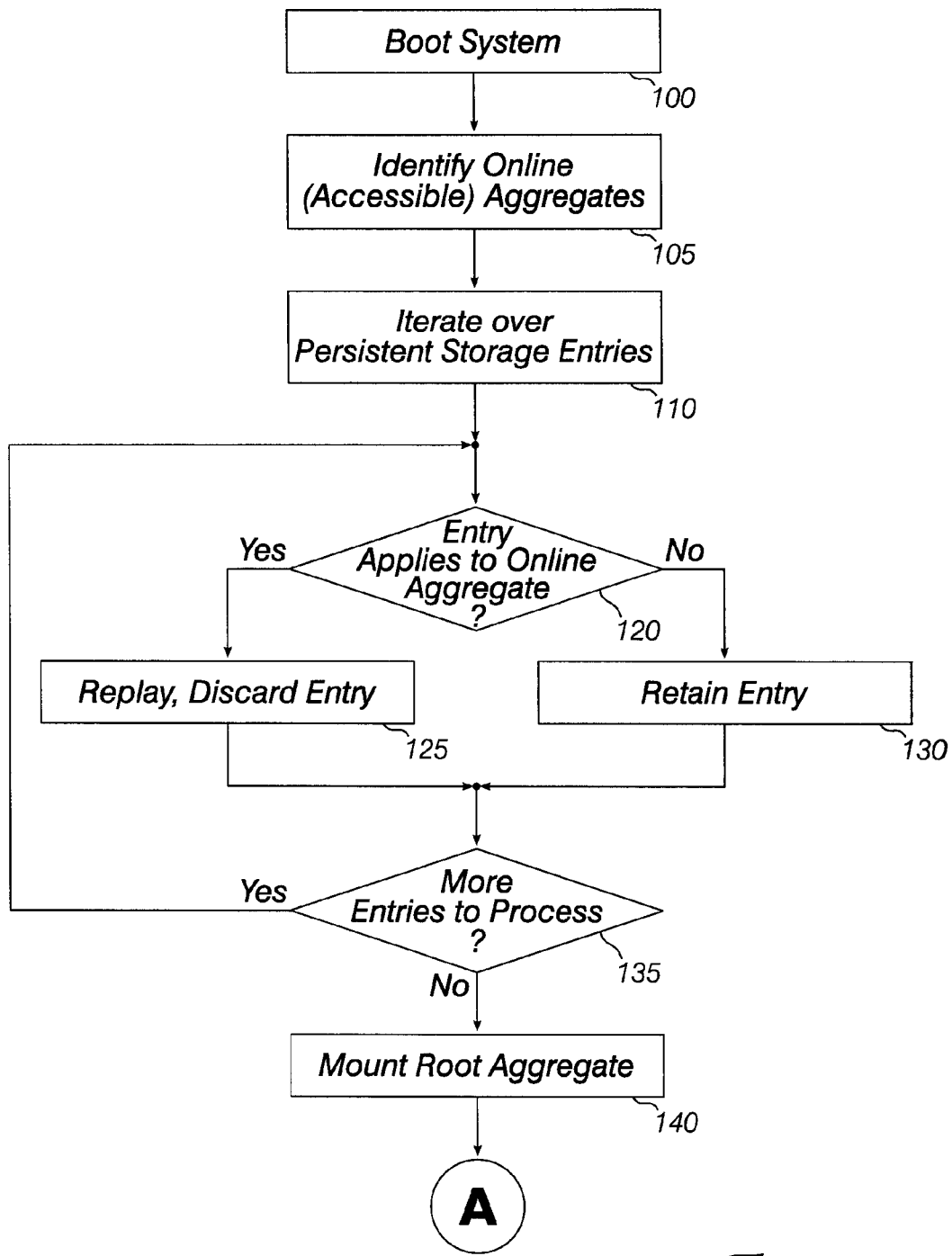
FIGS. 1A and 1B show a flow chart outlining operations according to embodiments of the invention.
Figure 1B:
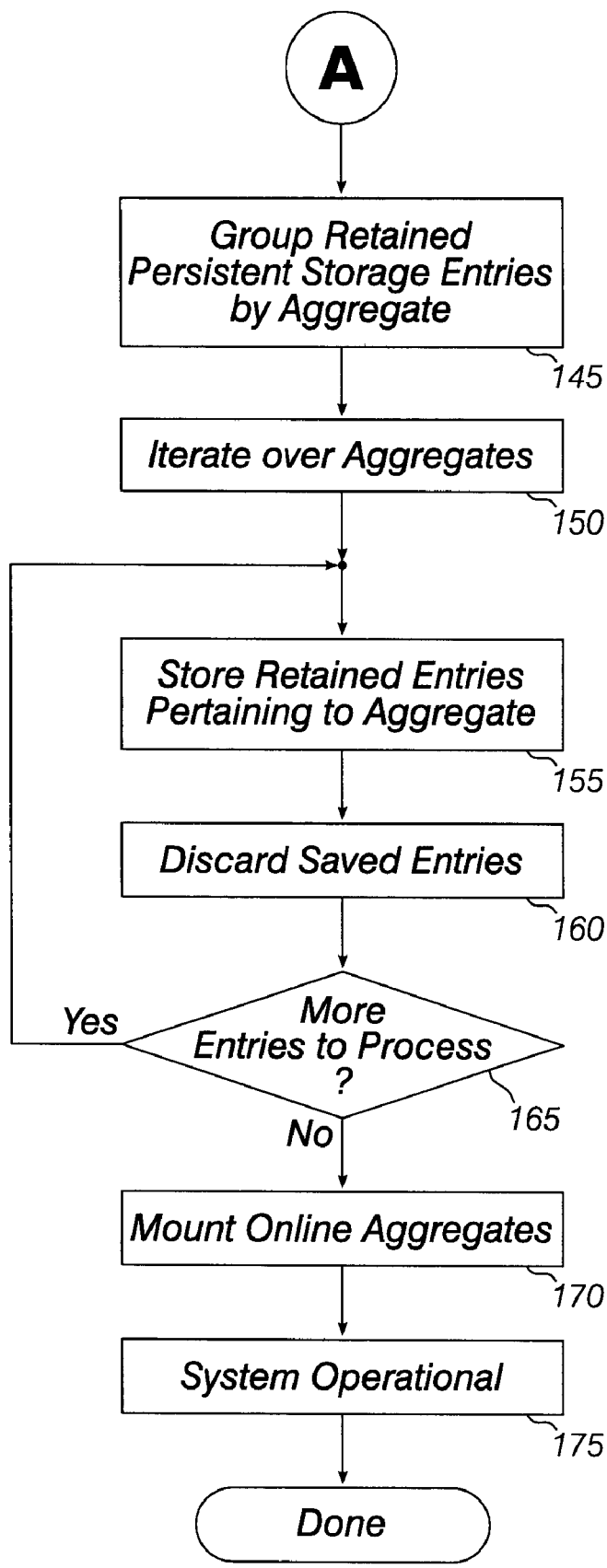

An embodiment of the invention solves the problem differently, as outlined in FIGS. 1A and 1B. During storage server initialization, uncommitted data found in a persistent storage are committed to a destination aggregate if the aggregate is accessible, and saved in a file if the aggregate is not accessible. Either way, the data can be removed from persistent storage, freeing this important resource for ongoing client servicing.

The process may begin when the system boots (100), although it can also occur at other times described below. Accessible aggregates are identified (105). An aggregate is one or more mass storage devices operated together, for example as a Redundant Array of Independent Disks ("RAID Array"), on which user data may be stored. An aggregate is considered "accessible" here if data can be written to it. Note that in some circumstances, an aggregate may be available for reading, but not for writing, because (for example) too many of the individual devices in the aggregate have failed, so the required level of data redundancy cannot be provided for newly-written data.

After aggregate identification, the system iterates over entries it finds in the persistent storage (110). As explained above, these entries represent parity and checksum information about client data that was to have been written to disk, but may not have been written before the system crashed. For each entry, if the entry applies to an online aggregate (120), it is "replayed" by writing the data to the appropriate disks of the online aggregate, and then discarded from the persistent storage (125). If the entry applies to an aggregate that is not online, it is retained in the persistent storage (130). If there are more entries to process (135), the iteration continues.

After all the entries found in the persistent storage have been processed (by either replaying and discarding, or retaining) a "root" aggregate is mounted (140). The root aggregate typically contains a filesystem with information to configure the storage server; it may also contain user files and directories.

Continuing in FIG. 1B, the retained entries in the persistent storage are grouped according to the aggregate to which they pertain (145) (recall that these aggregates are all offline—they were not identified as accessible during operation 105). Now, iterating over these (150), all retained entries pertaining to an offline aggregate are stored in an ordinary file on the root aggregate (155), and then the entries are discarded from the persistent storage (160). A file containing these entries may be called an "NVRAM file." If there are more entries (e.g., for other offline aggregates) (165), the iteration continues. Otherwise, online aggregates are mounted (170) and the storage server commences ordinary operations (175).

As a result of the procedure outlined in FIGS. 1A and 1B, parity and checksum information relating to user data that was scheduled to be written to disk, but could not be written before a system crash or other service interruption, is preserved even if the aggregate to which it was to be written is not available. Furthermore, the data can be removed from persistent storage, so all of the memory becomes available for improving the performance of ongoing storage functions. The NVRAM file(s) containing the data that could not be written to their destination aggregates are protected against loss or damage by the RAID (or other) redundancy available on the root aggregate, and can be backed up to long-term storage or transmitted to other machines just as any other file can. Note that the data in one of these files may pertain to several different user files or directories that happened to be simultaneously active when the system crashed. Records in a file were all intended to be written to the same aggregate, but may have no other relationships or common characteristics.

Figure 4:
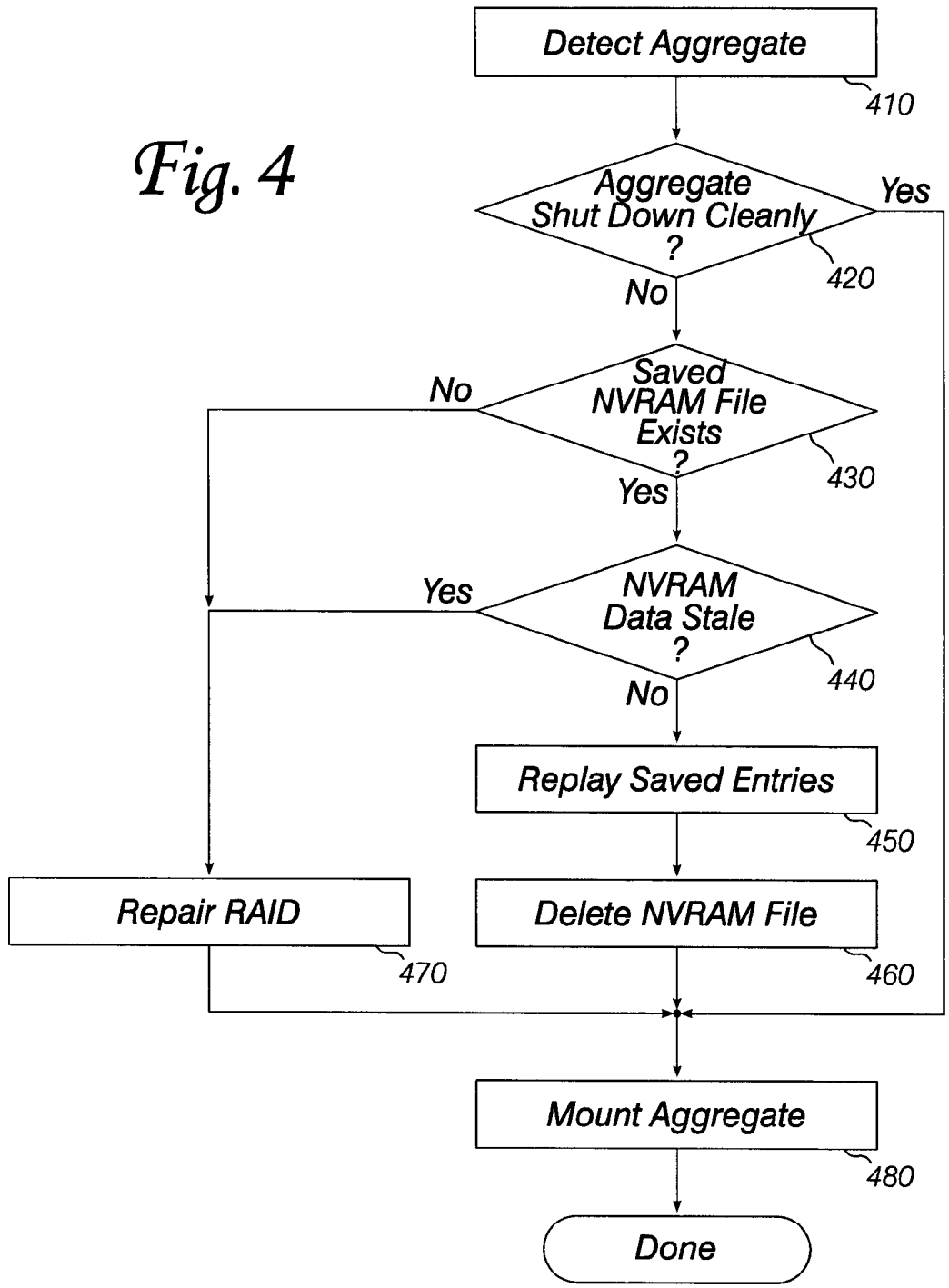
FIG. 4 is a flow chart showing details of an aggregate recovery process according to an embodiment of the invention.

FIG. 4 outlines a process by which a file containing saved persistent data (e.g. NVRAM entries), produced as described above, can be used. This process is executed when an aggregate is detected (when it becomes available for writing). This may be at server boot-up, or later, if an offline aggregate is brought online while the server is operating normally. Under some circumstances, an aggregate may be available for reading, but not for writing. Such read-only aggregates are not considered to be "available" for the purposes of this method.

First, an aggregate is detected (410). If the aggregate was shut down cleanly (i.e. without any outstanding client data writes) (420), then it can be mounted (480) immediately. (Clean shutdown can be detected by flags or other information written to the aggregate during the shutdown process. The clean/unclean determination can generally be made very quickly.) If the aggregate was not shut down cleanly, then a search for a saved NVRAM file is made. If no NVRAM file exists (430), the system must perform a potentially lengthy RAID group parity recalculation process (470), after which the aggregate may be mounted (480). If the file exists, then its contents are checked to see whether they are "stale" (440). Staleness is discussed in some detail below. If the NVRAM file is stale, then the check/repair process must be performed (470). If the NVRAM file contains good (i.e., not stale) data, then the entries in the file are replayed (450) and the file is deleted (460) before the aggregate is mounted (480). Replaying the entries at operation 450 can be performed by the same software that replays persistent storage entries during system initialization (FIG. 1A, 125). The difference is that the entries replayed at 450 come from a file, rather than from the persistent storage.

Stale Data

When an aggregate goes offline unexpectedly (e.g. as a result of a hardware failure or system crash), parity and checksum information relating to user data that was to be written to the aggregate may be left behind in persistent storage. If the aggregate can be brought back online in exactly the same state, then its contents, in combination with the information in persistent storage (which may have been saved to a file), can bring the aggregate to a consistent state without any user data loss or corruption. However, several events may occur that could impact this ideal recovery scenario. First, the aggregate may be brought online with a storage server that does not have either the persistent storage or the file containing the applicable user data copies to repair the aggregate. In this case, the aggregate may have been subjected to an automatic checking and repair process (for example, FIG. 4, operation 470). If the aggregate has been repaired, its data, filesystems and the like will be in a consistent state, but some user data may have been lost or corrupted. However, if the saved persistent storage records in an NVRAM file are subsequently applied to the repaired aggregate, its consistency may be impaired, and even more user data may be lost. It is important not to replay saved records if the destination aggregate has changed from its state when it was unexpectedly taken offline. One example of this scenario is if an aggregate is disconnected from a first storage server (with outstanding data in the first server's NVRAM) and then the aggregate is moved to a second storage server. When the aggregate comes online at the second server, but the first server's uncommitted parity data is unavailable, the second server may repair the aggregate. If the first server's uncommitted data is subsequently provided to the second server, the second server must not apply it to the repaired aggregate.

Information stored with the aggregate and corresponding information stored with the saved records in an NVRAM file can help identify stale entries. In some embodiments, an aggregate may be marked with a universally-unique identifier ("UUID"), an identifier of the last system on which the aggregate was mounted, and a sequential "mount count" or "generation count." (The system identifier can be thought of as specifically identifying the non-volatile memory from which the saved records came. Some storage servers permit the non-volatile memory itself to be moved from system to system, and the important information from the perspective of an embodiment of the invention is which persistent memory the records in an NVRAM file came from.) These identifiers and sequence numbers can be stored with entries in the persistent storage and with files containing persistent storage entries pertaining to an aggregate. Then, before replaying saved entries (FIG. 4, 450) the aggregate's UUID is checked so that saved entries from the wrong aggregate are not applied. The last system and mount count can show whether the aggregate was repaired and mounted without benefit of the saved entries. Other embodiments of the invention may use different information to establish whether the aggregate is in the correct state so that saved entries can be replayed. If the aggregate is not in the right state, then the saved entries are stale and should not be replayed.

It is appreciated that saved persistent-storage entries are idempotent: they can be replayed repeatedly without ill effect, as long as no subsequent write operations occur between replayings. Thus, for example, if an aggregate is detected and a file of saved entries is replayed, but the system unexpectedly crashes before completing the file replay process or deleting the file, it is safe to replay the file again after the next reboot. This is important, because it is possible that the persistent-storage entries were actually written to their destination aggregate one or more times before the system crash, but had simply not been discarded from the persistent memory.

Figure 5:
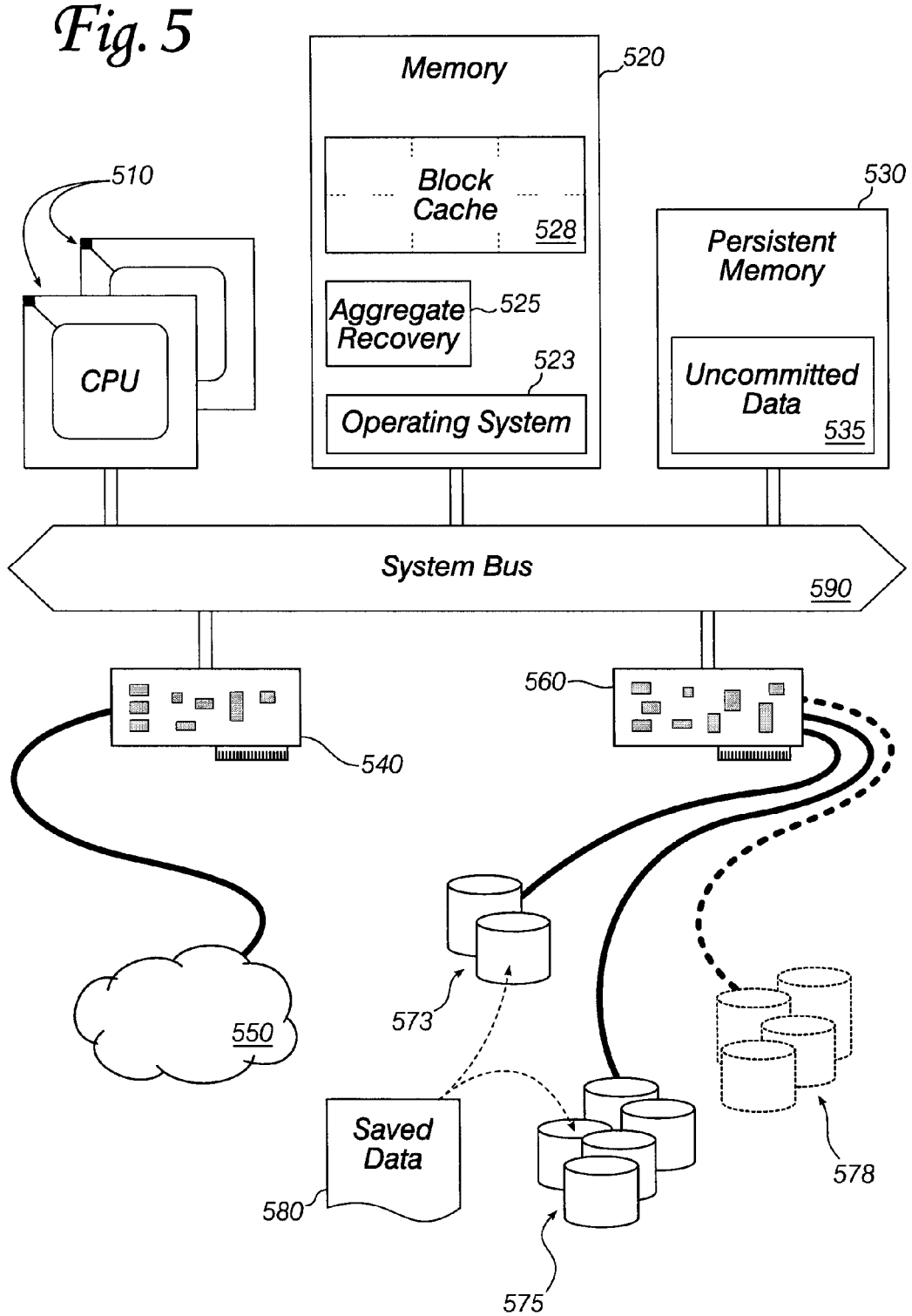
FIG. 5 shows components and subsystems of a storage server that contains an embodiment of the invention.

FIG. 5 shows some components and subsystems of a storage server that implements an embodiment of the invention. One or more programmable processors (central processing units or "CPUs") 510 execute instructions stored in memory 520, causing the CPU(s) to perform operations as described above. Memory 520 may contain data and instructions of an operating system 523, which manages and controls the other system resources. Aggregate recovery logic 525 includes data and instructions to perform the methods of FIGS. 1A and 1B, and FIG. 4. A block cache 528 stores client data that has been prepared for writing to the disks in an aggregate, but has not yet been written. Persistent storage 530 may be a Flash memory, a battery-backed random-access memory ("RAM"), or similar storage facility. Persistent storage 530 contains copies of client data and RAID parity/checksum data 535 that has not yet been committed to storage on an aggregate.

A network interface 540 permits the system to exchange data with clients via a distributed data network 550 such as the Internet. A mass storage interface 560 allows the system to read and write data on devices such as hard disks 573, 575 that make up aggregates. For example, disks 573 may be a root aggregate, and disks 575 may be a user data aggregate. A file 580, which may be stored on root aggregate 573 or on a user data aggregate 575, contains uncommitted data detected in a server's persistent memory at boot-up, that could not be replayed on an aggregate then available. For the purposes of embodiments of this invention, "uncommitted" means user data and associated RAID parity or checksum data that was stored (cached) pending a planned write to a long-term mass storage device such as a disk drive or RAID array, which has not yet been written to its intended destination. As noted above, uncommitted data is idempotent: it may actually have been stored at its intended destination but not yet discarded from the persistent memory. Treating this data as "uncommitted" does not impair system operation or the correctness of the stored data.

If the aggregate 578 is later detected, saved data 580 may be replayed if it is not stale. A system bus 590 interconnects the aforementioned components, allowing them to exchange data and control signals.

Figure 6:
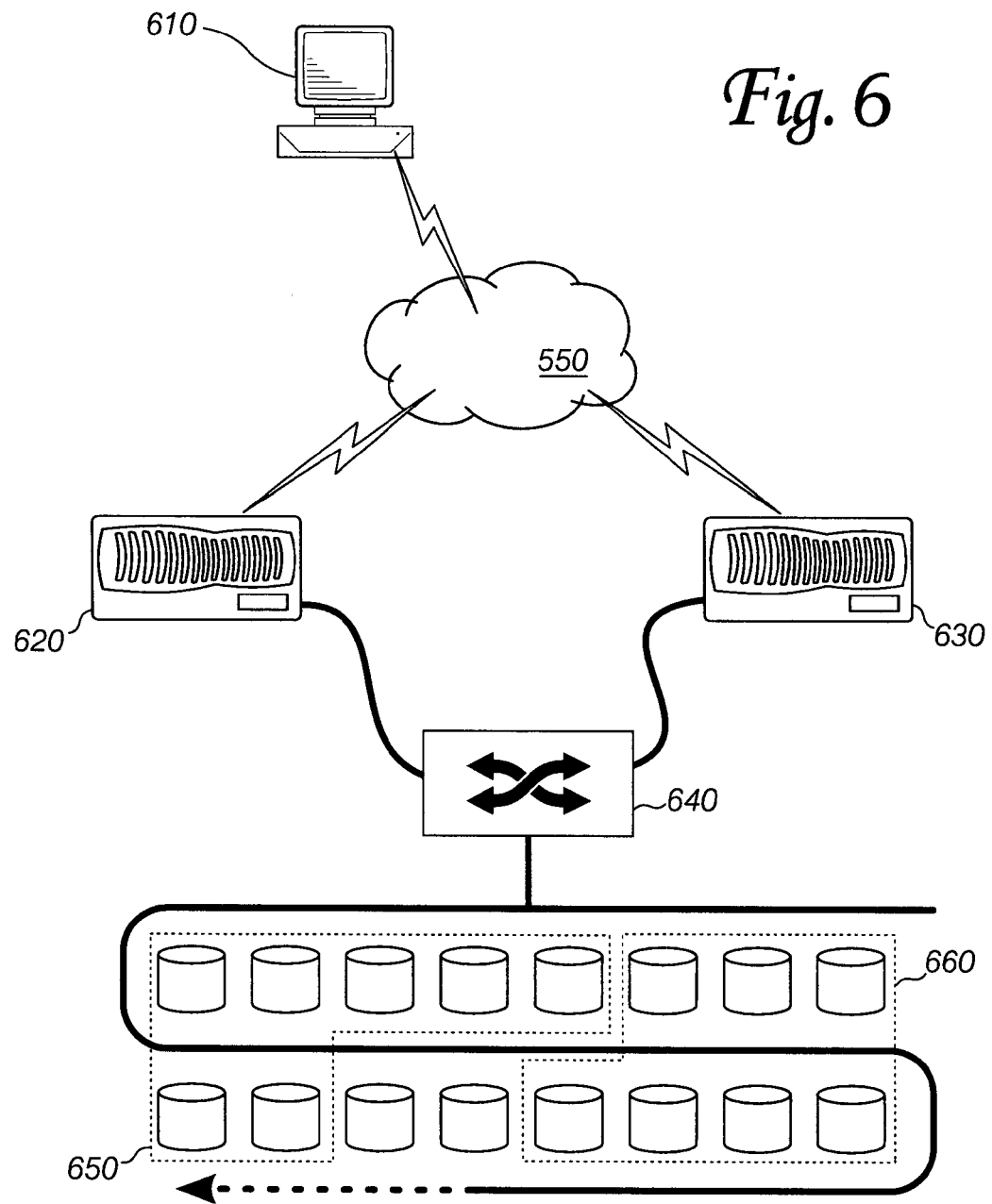
FIG. 6 shows an environment including two storage servers that use embodiments of the invention.

FIG. 6 shows an environment including two storage servers implementing an embodiment of the invention. A client system 610 interacts with the servers 620, 630 over a data network 550, causing them to store or retrieve data. Servers 620 and 630 are both connected to one or more aggregates. In this environment, a Fibre Channel switch 640 mediates access between the servers and a plurality of individual disks (other embodiments could use a different type of interconnect). Either server may be capable of accessing any disk, but the servers may cooperate and respect the convention that disks in a first group 650 "belong to" server 620, while disks in a second group 660 "belong to" server 630. (In other environments, each server of a plurality of servers may have its own dedicated disks, with no sharing of a switched fabric like the Fibre Channel switch 640 shown here.)

Figure 7:
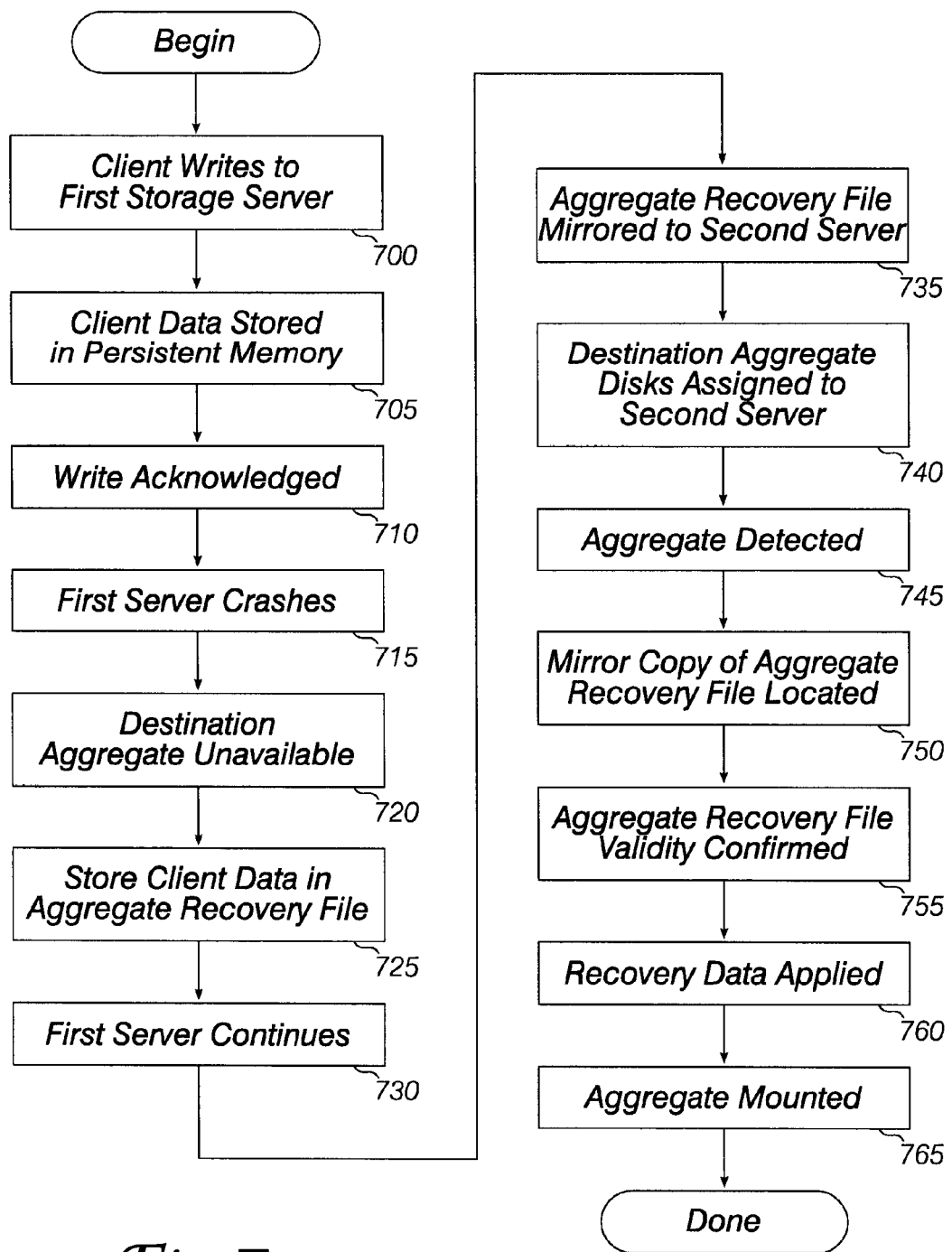
FIG. 7 outlines a sequence of events and operations that may occur in an environment such as that illustrated in FIG. 6.

Software in the servers may operate to maintain a "mirror" (exact copy) of data at one server, on disks belonging to the other server. Embodiments of the invention can be useful in such a data minoring configuration involving two or more storage servers. FIG. 7 outlines a sequence of operations that may occur during the operation of two servers that perform minoring. First, one server (e.g. 620) receives a client write operation (700). The client's data and associated RAID group data is stored in persistent storage (705) and the write is acknowledged (710). Before the client data can be committed to disk, the server crashes (715). Upon reboot, the destination aggregate is inaccessible (720), so the client and RAID parity data from persistent storage is placed in an aggregate recovery file on the root aggregate (725) and the server resumes operation (730). The other server (e.g. 630) maintains a mirror of the first server's root aggregate, so it obtains a copy of the aggregate recovery file (735). Ownership of the disks comprising the destination aggregate is transferred to the second storage server (740). When the aggregate is detected there (745), the mirror copy of the aggregate recovery file is located (750), determined to contain valid (non-stale) data (755), and applied (replayed) to the aggregate (760). Finally, the aggregate (in a consistent state and complete with the data written by the client) is mounted on the second storage server (765).

This example shows several benefits of embodiments of the invention: user and RAID parity data is preserved despite hardware and software failures that might otherwise force a server to discard the data or hold it in persistent storage indefinitely (preventing the use of that storage to improve ongoing client responsiveness). Data to recover an aggregate, stored in an ordinary file, can be backed up or transferred to another system easily, and can be used there to repair the aggregate if it is detected at the other system. This permits aggregates to be moved from one system to another even if hardware or software problems at the previous system caused an unclean shutdown of the aggregate. In addition, storing aggregate recovery data in an ordinary file (for example, a file located on a mounted root aggregate) permits the storage process to benefit from all the functionality and optimizations of the storage server. In contrast, a naive implementation might simply write the recovery data in a specially-allocated, fixed portion of a disk, which might be slow, might overwrite important data previously stored there, or might fail to take advantage of secure (RAID-protected) storage.

In some embodiments, enough system functionality may be available at start-up for the aggregate recovery data to be transmitted to (or mirrored at) a cooperating system for storage in a file there, in addition to (or instead of) storing the data in an NVRAM file on the locally-connected root aggregate.

Embodiments of the invention also permit an aggregate to be moved seamlessly from one controlling system to another, even when it is in an active state and still serving client input/output ("I/O") requests. Just as in the post-crash, boot-up procedure, the storage server from which the aggregate is to be moved will collect uncommitted data records from its persistent memory and place them in a file or otherwise transfer them to the storage server that is to acquire the aggregate. The acquiring storage server checks the uncommitted data records for staleness and then replays them onto its newly-acquired aggregate. Since a Fiber Channel switch like that shown at FIG. 5, element 540, may permit any controlling system to take ownership of any disk at any time, an aggregate can be transferred at will, even if some user data is still cached and has not yet been committed to the aggregate.

An embodiment of the invention may be a machine-readable medium having stored thereon data and instructions to cause a programmable processor to perform operations as described above. In other embodiments, the operations might be performed by specific hardware components that contain hardwired logic. Those operations might alternatively be performed by any combination of programmed computer components and custom hardware components.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a commonly-available source code package that does not contain an embodiment.

In the preceding description, numerous details were set forth. It will be apparent, however, to one skilled in the art, that the present invention may be practiced without these specific details. In some instances, well-known structures and devices are shown in block diagram form, rather than in detail, to avoid obscuring the present invention.

Some portions of the detailed descriptions were presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, compact disc read-only memory ("CD-ROM"), and magnetic-optical disks, read-only memories ("ROMs"), random access memories ("RAMs"), eraseable, programmable read-only memories ("EPROMs"), electrically-eraseable read-only memories ("EEPROMs"), Flash memories, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals)), etc.

The applications of the present invention have been described largely by reference to specific examples and in terms of particular allocations of functionality to certain hardware and/or software components. However, those of skill in the art will recognize that robust storage server operations, including file-based storage of persistent memory data records intended to be written on a mass storage device, can also be implemented by software and hardware that distribute the functions of embodiments of this invention differently than herein described. Such variations and implementations are understood to be captured according to the following claims.

What is claimed is:

1. A system comprising:
a first storage server including a persistent memory;
a second storage server;
a data switch to couple a plurality of mass storage devices to the first storage server and the second storage server, wherein a first group of the mass storage devices are controlled by the first storage server and a second group of the mass storage devices are controlled by the second storage server;
aggregate recovery logic in the first storage server to collect data records pertaining to the first group of mass storage devices from the persistent memory; and
aggregate recovery logic in the second storage server to apply the collected data records to the first group of mass storage devices after the second storage server takes control of the first group of mass storage devices, the applying comprising:
detecting an accessible aggregate, wherein the detected accessible aggregate was previously inaccessible,
determining whether the detected accessible aggregate was last shut down cleanly with no outstanding client data writes,
if the detected accessible aggregate was not last shut down cleanly, identifying a file containing uncommitted data records that correspond to the detected accessible aggregate, and
replaying the uncommitted data records from the file containing uncommitted data records that corresponds to the detected accessible aggregate onto the detected accessible aggregate.

2. The system of claim 1, wherein the first group of mass storage devices comprise a Redundant Array of independent Disks ("RAID Array").

3. The system of claim 1, wherein the data switch is a Fibre Channel switch.

4. The system of claim 1, wherein the persistent memory is one of a flash memory, a battery-backed random access memory or a nonvolatile random access memory.

5. A computerized system comprising:
a storage server coupled to a persistent memory, the storage server operative to:
detect Redundant Array of independent Disks ("RAID array") data that was cached in the persistent memory before a booting operation, the RAID array data to be stored on a mass storage aggregate that was available for writing before the booting operation but is unavailable for writing after the booting operation,
store the RAID array data in a file, wherein the file includes a sequence identifier of the unavailable mass storage aggregate, wherein the sequence identifier identifies whether the unavailable mass storage aggregate was repaired and mounted without the stored RAID array data,
detect that the mass storage aggregate has become available for writing,
determine whether the available mass storage aggregate was last shut down cleanly with no outstanding client data writes,
if the available mass storage aggregate was not last shut down cleanly, identify the file, and
write the RAID array data from the file to the mass storage aggregate.

6. The system of claim 5, wherein an accessible aggregate is a Redundant Array of Independent Disks ("RAID array") that is presently capable of storing data, and an inaccessible aggregate is a RAID array that is presently incapable of storing data.

7. The system of claim 5, wherein the storage server is further operative to:
test the file containing uncommitted data records that corresponds to the detected accessible aggregate to determine whether the uncommitted data records in the file containing uncommitted data records that corresponds to the detected accessible aggregate are stale bethre writing the RAID array data.

8. The system of claim 5, wherein the storage server is a first storage server, wherein the system is further operative to:
transmit the file to a second, different storage server.

9. The system of claim 5, wherein the storage server is further operative to:
store the file on a backup medium.

10. The system of claim 5, wherein the persistent memory is one of a non-volatile random access memory ("NVRAM"), a battery-backed random access memory ("RAM"), or a Flash memory.

11. A system comprising:
a storage server coupled to a persistent memory, the storage server operative to, during a system initialization of the storage server:

identify uncommitted data records representing client write requests stored in a short-term persistent store of the storage server, for each identified uncommitted data record, determine whether a corresponding aggregate is accessible, for each identified uncommitted data record that corresponds to an inaccessible aggregate, store the data record in a file and delete the data record from the short-term persistent store, and when a corresponding aggregate that was inaccessible during the identifying operation becomes newly accessible, determine whether the newly accessible aggregate was last shut down cleanly with no outstanding client data writes and if the detected accessible aggregate was not last shut down cleanly, replay the data records from the file to commit the data records to the newly accessible aggregate, wherein the data records from the file include a sequence identifier of the newly accessible aggregate, wherein the sequence identifier identifies whether the newly accessible aggregate was repaired and mounted without the data records from the file.

12. A non-transitory computer-readable storage medium embodied with executable instructions that cause a processor to perform operations comprising:

identifying uncommitted data records in a persistent store of a data storage server during system initialization of the data storage server;

saving each of the identified uncommitted data records onto a corresponding aggregate if the corresponding aggregate is accessible;

storing each of the identified uncommitted data records that corresponds to an inaccessible aggregate in a file that corresponds to the inaccessible aggregate, the file that corresponds to the inaccessible aggregate including a sequence identifier of the inaccessible aggregate, wherein the sequence identifier identifies whether the inaccessible aggregate was repaired and mounted without storing the identified uncommitted data records on the inaccessible aggregate;

detecting an accessible aggregate, wherein the detected accessible aggregate was previously inaccessible;

determining whether the detected accessible aggregate was last shut down cleanly with no outstanding client data writes;

if the detected accessible aggregate was not last shut down cleanly, identifying a file containing uncommitted data records that correspond to the detected accessible aggregate; and replaying the uncommitted data records from the file containing uncommitted data records that corresponds to the detected accessible aggregate onto the detected accessible aggregate.

13. The non-transitory computer-readable storage medium of claim 12, wherein an accessible aggregate is a Redundant Array of Independent Disks ("RAID array") that is presently capable of storing data, and an aaccessible aggregate is a RAID array that is presently incapable of storing data.

14. The non-transitory computer-readable storage medium of claim 12, wherein the executable instructions cause the processor to perform operations further comprising:

testing the file containing uncommitted data records that corresponds to the detected accessible aggregate to determine whether the uncommitted data records in the file containing uncommitted data records that corresponds to the detected accessible aggregate are stale before the replaying operation.

15. The non-transitory computer-readable storage medium of claim 12, wherein the file includes:

an identifier of the inaccessible aggregate; and an identifier of the persistent store.

16. The non-transitory computer-readable storage medium of claim 12, wherein the data storage server is a first data storage server, and wherein the executable instructions cause the processor to perform operations further comprising:

transmitting the file to a second, different data storage server.

17. The non-transitory computer-readable storage medium of claim 12, wherein the executable instructions cause the processor to perform operations further comprising:

storing the file on a backup medium.

18. The non-transitory computer-readable storage medium of claim 12, wherein the persistent store is one of a non-volatile random access memory ("NVRAM"), a battery-backed random access memory ("RAM"), or a flash memory.

* * * * *